United States Patent
Kozma

[11] 3,970,358
[45] July 20, 1976

[54] COHERENT, QUASI-MONOCHROMATIC LIGHT SOURCE

[75] Inventor: Adam Kozma, Ann Arbor, Mich.

[73] Assignee: Harris Corporation, Cleveland, Ohio

[22] Filed: Jan. 20, 1975

[21] Appl. No.: 542,185

[52] U.S. Cl. .......................... 350/3.5; 350/162 ZP
[51] Int. Cl.² ....................................... G02B 5/32
[58] Field of Search ................. 350/3.5, 162 ZP

[56] References Cited
UNITED STATES PATENTS

| | | | |
|---|---|---|---|
| 3,675,990 | 7/1972 | Kogelnik et al. | 350/3.5 |
| 3,776,727 | 12/1973 | Nassenstein | 350/3.5 |
| 3,778,361 | 12/1973 | Courtney-Pratt | 350/3.5 UX |
| 3,901,578 | 8/1975 | Hudson | 350/3.5 |

OTHER PUBLICATIONS

Sincerbox, *IBM Technical Disclosure Bulletin*, vol. 10, No. 3, Aug. 1967, pp. 267–268.
Stroke et al., *Physics Letters*, vol. 20, No. 4, Mar. 1966, pp. 368–370.
*Electronics*, vol. 39, No. 6, Mar. 21, 1966, p. 42.

*Primary Examiner*—Ronald J. Stern

[57] ABSTRACT

A volume hologram is utilized to convert an extended, polychromatic light source into an efficient spatially coherent, quasi-monochromatic light source.

5 Claims, 3 Drawing Figures

COHERENT, QUASI-MONOCHROMATIC LIGHT SOURCE

BACKGROUND OF THE INVENTION

The present invention is in the field of optics. More specifically, the invention makes use of volume holograms to convert an extended, polychromatic light source to an efficient spatially coherent, quasi-monochromatic light source.

Holograms recorded in thick media are called volume holograms. Since a thick recording medium is not generally a sufficient condition for forming a volume hologram, "thickness" is defined in terms of a quality factor Q defined as $$Q = \frac{2\pi \lambda t_o}{n\, d^2}$$

where $\lambda$ in the wavelength of the coherent light source used to construct the hologram, $t_o$ is the physical thickness of the hologram recording medium, $n$ is the index of refraction of the recording medium and $d$ is the average three dimensional grating period. As a rule, holograms are classified as the volume type provided that $Q >> 10$. In practice, this requires a recording media that has a physical thickness on the order of (1) millimeter (mm) or greater.

The response of holograms in thick media, such as thick photographic emulsions, photopolymers, photodegradable polymers and so forth is measured in terms of diffraction efficiency, angular orientation sensitivity and wavelength sensitivity of the reconstruction. These factors are themselves a function of several hologram recording parameters, including thickness of the hologram, angles of incidence of the light beams used to construct the hologram, angle of incidence of the reconstruction (i.e., readout) beam, and exposure characteristics of the hologram medium.

The diffraction efficiency is the ratio of the intensity of the light diffracted by the hologram upon reconstruction, to the intensity of the incident light. The quality of the hologram may be judged by the amount of diffracted light contributing to the reconstruction of the original wavefront.

The angular orientation sensitivity (i.e., the sensitivity in terms of the intensity of the diffracted wave for various angular orientations between the surface of the hologram and the incident readout beam) is measured as the angular width between half-power points of the curve of diffracted wave intensity versus the readout beam angle.

The wavelength sensitivity of the reconstruction can be measured as the wavelength bandwidth between half-power points on the curve of diffracted intensity versus beam wavelength.

Construction of a hologram in a thick recording medium is typically affected by recording the interference pattern of two coherent monochromatic waves constituting the signal beam and the reference beam. The signal beam 10 and the reference beam 11 are incident on the surface of the thick recording medium 12 at arbitrary angles $\theta_s$ and $\theta_r$, respectively, to the normal to the surface of the medium 12, as shown in FIG. 1. The two beams are oriented relative to the surface of the medium such that the interference fringe surfaces are oblique to that surface. In the regions of the recording medium where the incident signal and reference beams overlap, interference fringe planes 14 of constant intensity, and hence constant exposure, bisect the angle between the two wavefronts. These planes form a three-dimensional pseudograting of thickness $t_o$ having a period in one direction (i.e., the direction of a line perpendicular to the bisector of the angle between the two beams, in a plane containing the rays representative respectively of the two beams).

Readout is effected by illuminating the hologram (which is simply the interference pattern recorded in the thick medium) with a reconstructing beam constituting one of the two original waves used in the recording process, at the original angle of incidence of that wave. This causes the emergence from the hologram of a diffracted wavefront identical to the complex wavefront of the other original wave. An observer or detector positioned in the path of the diffracted wavefront sees a three-dimensional virtual image of the object originally illuminated by the signal beam.

It is desirable for enhancing diffraction efficiency, to obtain uniform penetration of the thick recording medium by the two recording beams (signal and reference). Uniformity of penetration is largely dependent upon the nature of the recording medium.

It has been observed that the angular orientation sensitivity of volume holograms is high when $Q >> 10$; that is, little light is diffracted from the hologram when the angle of incidence of the readout beam differs from the Bragg angle (one-half the angle between the two original recording beams) by more than a few minutes of arc.

It has also been observed that the wavelength selectivity of volume holograms is high when $Q >> 10$; that is, little light is diffracted from the hologram when the reconstructing wavelength differs from the recording wavelength by more than about 10 A.

In both cases the half-power bandwidth is known to be inversely proportional to the thickness $t_o$ of the hologram.

SUMMARY OF THE INVENTION

Briefly, the present invention takes advantage of the characteristics and response of holograms recorded in thick media to provide a quasi-monochromatic wave emanating from an apparent point source, using a broad incoherent light source in conjunction with a volume hologram and suitable optics.

An effective spatially coherent and quasi-monochromatic source can be created from a broad incoherent polychromatic light source by the use of lenses, a pinhole and a spectral filter. Heretofore, a coherent quasi-monochromatic source has typically been obtained by focusing the light emanating from a point of the broad source onto a pinhole through a narrow band spectral filter. The size of the pinhole can be made small enough so that the source is spatially partially coherent while the bandwidth of the spectral filter can be made narrow enough to make the source quasi-monochromatic. Unfortunately, this technique severely limits the amount of power in the wave emitted by the apparatus since only the amount of power from one point of the broad incoherent source contained in the solid angle passed by the lens through the pinhole is available as spatially coherent radiation. In addition to this, only the portion of the polychromatic light passed by the narrow bandwidth filter is useful as quasi-monochromatic radiation.

The present invention is an improvement on these techniques since it greatly increases the useful spatially coherent quasi-monochromatic power which can be obtained from a broad incoherent polychromatic source.

DETAILED DESCRIPTION

Figure 1:
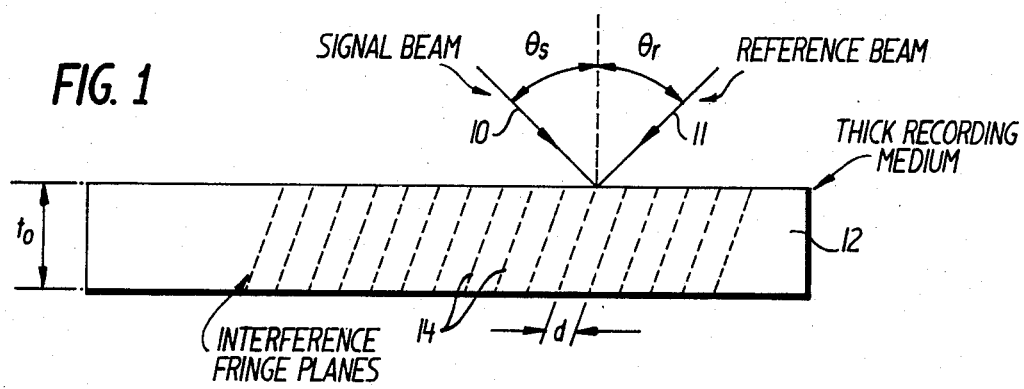
FIG. 1 is a diagram useful in explaining recording of holograms in thick media.
Figure 2:
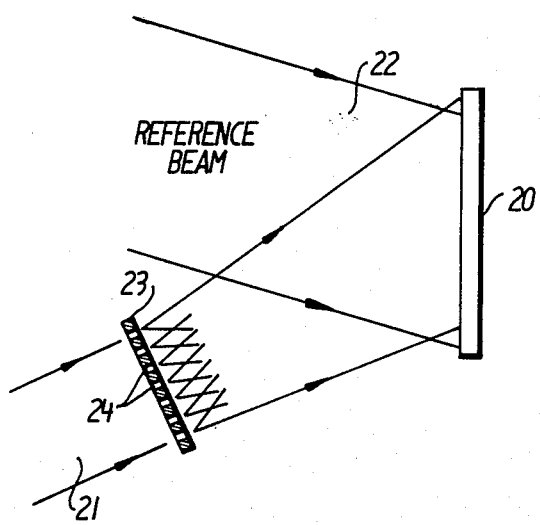
FIG. 2 is a diagram illustrating the recording of volume hologram according to the invention.

Referring to FIG. 2, a hologram is recorded in a thick medium 20 sensitive to electromagnetic radiation. Preferably, recording medium 20 is plexiglass (polymethylmethacrylate) from two to three millimeters (mm) thick having a sensitivity to blue, near ultraviolet (UV) light and providing Q-value of 1000 or more.

Both the signal and reference beams 21, 22 are obtained from a coherent monochromatic light source, such as a laser, and are oriented so as to illuminate the medium 20 from opposite directions relative to the normal to the surface of the recording medium. The interference patterns of the beams is recorded as fringe planes in medium 20, as previously described. According to the present invention, a mask 23 in the form of an opaque sheet having a matrix of pinholes 24 therein is placed in the path of the signal wavefront 22, as shown in FIG. 2. Preferably, the matrix consists of a pattern of evenly spaced rows or rows and columns of pinholes. The effect of the passage of the signal wavefront through the mask 23 is a though the signal beam illuminating the recording medium 20 emanates from a plurality of point sources equal in number to the number of pinholes in mask 23. The wavefront produced by each point source can be considered to interact with the reference beam to produce a separate hologram. Thus, medium 20 records the sum of the plurality of separate holograms.

Figure 3:
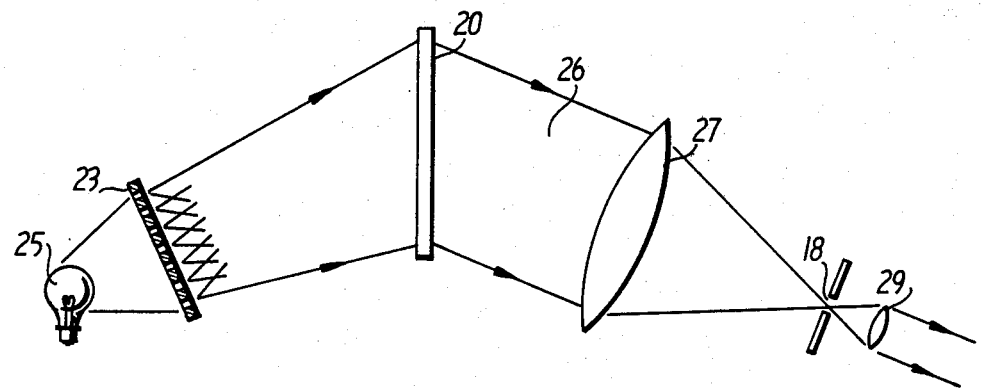
FIG. 3 is a diagram showing reconstruction to produce a coherent, quasi-monochromatic light source.

After the hologram 20 has been recorded, readout is accomplished by illuminating the hologram with a reconstructing beam obtained by passing light from a broad incoherent source 25 (FIG. 3) through the pinholes of mask 23 preferably positioned about 100 mm from the hologram. Again, the effect is illumination of the hologram by a plurality of point sources. As previously observed, thick recording media have high angular orientation sensitivity. A plot of diffraction wavefront intensity versus readout beam angle of incidence (or wavelength) reveals a $(\sin x/x)^2$ function with an exetremely narrow region between half-power points equal to approximately two to three minutes of arc (or about 10 angstroms of wavelength). Thus, each point on the mask 23 independently reconstructs the diffracted plane wave 26. Since a single reference beam was used during recording, these separate reconstructed wavefronts will be coincident. The intensity of plane wave 26 will, of course, be porportional to the number of pinholes illuminated. Also, the combined reconstructed wave will be spatially coherent because reference beam 22 was. The effect is that the diffracted wave contains more spatially coherent quasi-monochromatic power than can be obtained in the conventional way by a factor equal to the number of pinholes in the mask 23. It is important that the angle of incidence of the readout beam be within a few minutes (two to three, preferably) of the Bragg angle if mask 23 is positioned in front of the broad source 25. This criticality of positioning of source 25 is somewhat lessened if the mask 23 is not used since the hologram 20 will then select an appropriate plurality of point sources in the appropriate spectral region of the source automatically. However, if the mask 23 is not used, a narrow band spectral filter can be positioned in its place to make the light emergent from the hologram quasi-monochromatic.

The diffracted wavefront 26 is passed through a condensing lens 27 for convergence at a pinhole 28 from which the light emanates as though from a point source. A collimating lens 29, placed a short distance from the pinhole, is used to convert the diverging wavefront to a plane wavefront of the desired size. The result, then, is an intense spatially coherent quasi-monochromatic plane wave emanating from an apparent point source, essentially requiring only the volume hologram and an extended source of polychromatic light.

What is claimed is:

1. A method of converting a broad light source into a spatially coherent, quasi-monochromatic light source, which comprises recording a hologram in a thick recording medium as fringe planes of the interference pattern of a signal beam and a reference beam obtained from a coherent monochromatic light source, with an otherwise opaque matrix of pinholes disposed in the path of the wavefront of one of said signal and reference beams, and reading out the hologram with a reconstructing beam obtained from a polychromatic incoherent light source and incident on the hologram at an angle substantially equal to the angle of incidence of one of said signal and reference beams, to form a spatially coherent, quasi-monochromatic wavefront emanating from the hologram and wherein a matrix of pinholes corresponding to said otherwise opaque matrix of pinholes is disposed in the path of the wave front of said reconstructing beam.

2. The method according to claim 1, wherein the angle of incidence of the reconstructing beam on the hologram is within three minutes of the Bragg angle for the signal and reference beams used in the recording of the hologram.

3. The method according to claim 1, wherein a spectral filter is disposed in the path of the wavefront of the reconstructing beam.

4. The method according to claim 1 wherein said quasi-monochromatic wavefront emanating from said hologram is directed into a pinhole located on an opaque mask so as to produce a spatially coherent divergent wavefront.

5. The method according to claim 4 further including converting said divergent wavefront to a plane wave front.

* * * * *